United States Patent
Ohrn et al.

[11] Patent Number: 6,116,290
[45] Date of Patent: Sep. 12, 2000

[54] INTERNALLY INSULATED, CORROSION RESISTANT PIPELINE

[75] Inventors: Theodore Robert Ohrn, Alliance, Ohio; Leland Harris Taylor, Jr., Houston, Tex.

[73] Assignee: J. Ray McDermott, S.A., New Orleans, La.

[21] Appl. No.: 09/270,432

[22] Filed: Mar. 16, 1999

[51] Int. Cl.⁷ ........................................... F16L 9/14
[52] U.S. Cl. .......................... 138/149; 138/148; 138/113
[58] Field of Search ..................... 138/149, 114, 138/112, 113, 148

[56] References Cited

U.S. PATENT DOCUMENTS

| | | | |
|---|---|---|---|
| 813,918 | 2/1906 | Schmitz | 138/114 X |
| 2,440,245 | 4/1948 | Chevigny | 138/114 X |
| 4,351,365 | 9/1982 | Bauermeister et al. | 138/149 |
| 5,020,481 | 6/1991 | Nelson | 138/149 X |
| 5,056,564 | 10/1991 | Roth | 138/149 |
| 5,256,844 | 10/1993 | Grosvik et al. | 138/149 X |
| 6,000,438 | 12/1999 | Ohrn . | |

*Primary Examiner*—Patrick Brinson
*Attorney, Agent, or Firm*—Robert J. Edwards; D. Neil LaHaye

[57] ABSTRACT

An internally insulated, corrosion resistant pipeline. An inner fluid barrier is formed preferably by a polymer liner. The outer pipe may be a steel pipe. The liner is provided with a plurality of passages or an open annulus. The passages in the liner or annulus between the pipe and liner are filled with an insulation material.

15 Claims, 3 Drawing Sheets

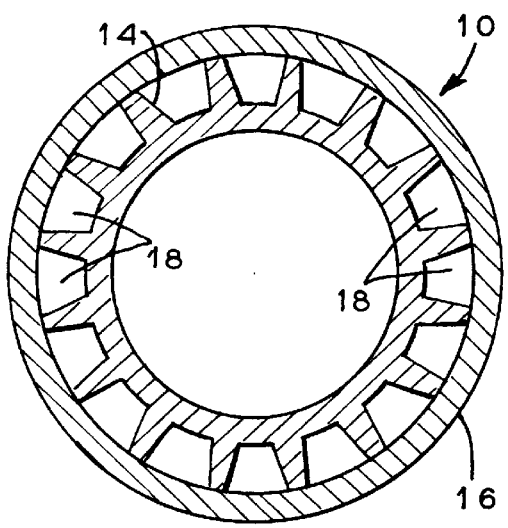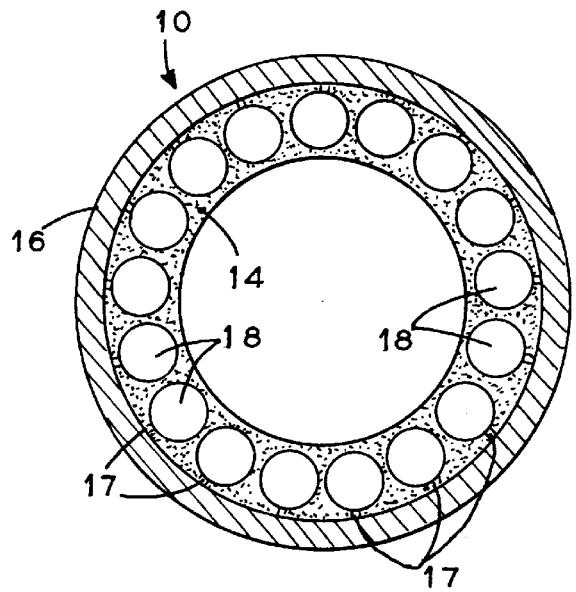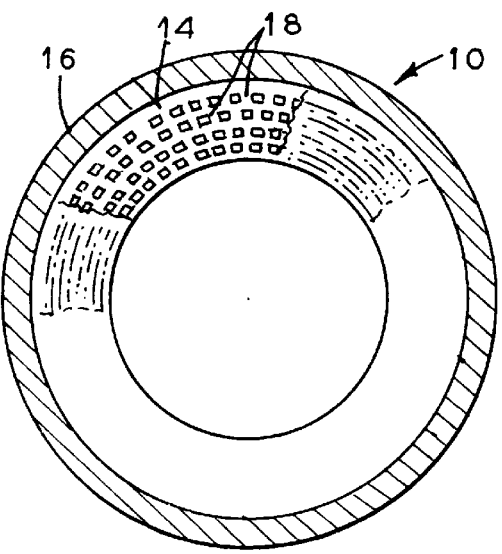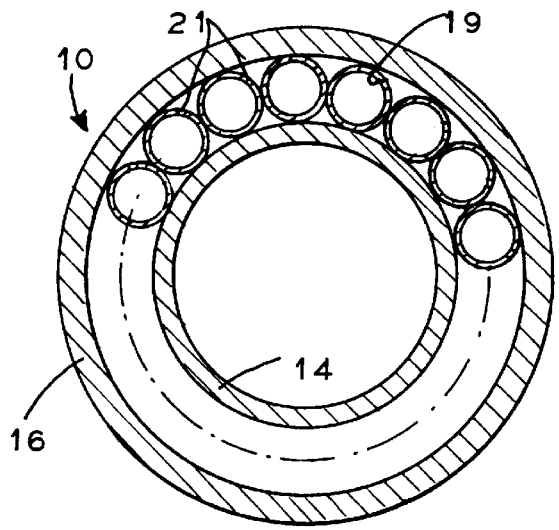

6,116,290

INTERNALLY INSULATED, CORROSION RESISTANT PIPELINE

BACKGROUND OF THE INVENTION

1. Field of the Invention

The invention is generally related to pipelines and more particularly to an internally insulated, corrosion resistant configuration.

2. General Background

In the offshore production of oil and gas, subsea flowlines transport fluids produced from the offshore gas and/or oil wells to a production station located some distance from the well. The contents of a flowline typically include oil, natural gas, and water. Subsea pipelines transport a single fluid such as oil, gas, or water for the purposes of export or injection. The mixture is at a warm temperature when first leaving the reservoir, but the contents cool as they flow through the line, with the cooling rate being rapid when the production flow is stopped (shut-in). When the flow line contents cool to sufficiently low temperatures, two serious problems can occur, hydrate formation and wax deposition. Hydrates form at sufficiently low temperatures when natural gas and water combine into an ice-like structure. Wax deposition begins when the walls of the pipe cool below the cloud point of the oil.

Insulating sub sea flow lines has been used as a means of minimizing steady-state heat loss from a flowing pipeline as well as to prolong the cool down of the contents once flow has been stopped. There are several commercially available insulation materials for application to sub sea flow line transport of fluids produced from offshore gas/oil wells. These include non-jacketed and pipe-in-pipe insulation. A non-jacketed insulation is coated directly on the exterior of a pipe. Pipe-in-pipe configurations include an insulation medium in the annulus between the inner pipe (carrier) and the outer pipe (jacket). Conventional external insulation is limited by pressure carrying ability and water absorption at deeper water depths. Conventional pipe-in-pipe technology uses two steel pipes fabricated together to form an annulus that is insulated by some means which may include polyurethane foam (PUF), insulating micro-spheres, or a vacuum. The resulting product is highly effective but costly to manufacture and install.

Methods other than insulation for keeping the pipe contents warm include active heating of the flow line by electrical or other means. In addition, injection of chemical inhibitors has been used to prevent wax deposition and hydrates. These methods are costly as well.

Another problem in many production applications is corrosion. The presence of $H_2S$ (hydrogen sulfide) and $CO_2$ (carbon dioxide) in a production stream or the transport of any corrosive fluid will cause serious corrosion of carbon steel pipes. Current methods to deal with corrosion include using corrosion resistant alloys (CRA's), either as a solid pipe or as a cladding on lining of a carbon steel pipe, corrosion resistant coatings on the inside of carbon steel, and use of a thermoplastic liner inside of carbon steel.

The shortcoming of CRA's and coatings is they are usually expensive. The shortcoming of thermoplastic lined pipe is that the permeability of the thermoplastic liner allows gas to pass through the liner and build up in the inter-annular region between the liner and the pipe. This mechanism can lead to liner collapse and/or failure of the liner system.

The known art leaves a need for improved configurations.

SUMMARY OF THE INVENTION

The invention addresses the above need. What is provided is an internally insulated, corrosion resistant pipeline. The fluid barrier is preferably a polymer material. The outer pipe may be a steel pipe. The annulus between the fluid barrier and steel pipe is provided with a plurality of passages. The passages in the liner are filled with an insulation material.

BRIEF DESCRIPTION OF THE DRAWINGS

For a further understanding of the nature and objects of the present invention reference should be made to the following description, taken in conjunction with the accompanying drawing in which like parts are given like reference numerals, and wherein:

FIG. 1 is a cross sectional view of the preferred embodiment of the invention.

FIGS. 2–4 are cross sectional views of alternate embodiments of the invention.

DETAILED DESCRIPTION OF THE PREFERRED EMBODIMENT

Figure 5:
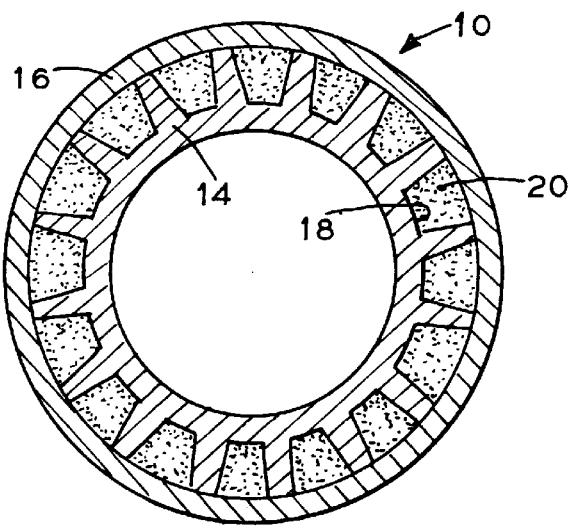
FIGS. 5–7 illustrate the use of an insulation material in the liner passages in the preferred and alternate embodiments of the invention.

Referring to the drawings, it is seen in FIG. 1 that the invention is generally indicated by the numeral 10. Pipeline 10 is generally comprised of a liner 14 and an outer pipe 16.

The liner 14 is preferably a polymeric material to act as the carrier for the produced hydrocarbon or corrosive/erosive fluid. The liner (carrier) pipe can be formed of any polymer material such as high-density polyethylene (HDPE), Carilon®, polyamide 11 (PA11), or a composite of multiple materials.

In the preferred embodiment, the liner 14 is provided with a plurality passages 18 around the outer perimeter of the liner. The passages 18 may be longitudinal or helical.

FIG. 1 illustrates passages 18 that are essentially U-shaped in cross section. FIG. 2 is an alternate embodiment and illustrates passages 18 that are circular in cross section. Each passage 18 is provided with a vent hole 17 to allow passage of gas build-up in the inter-annular region to pass through the passages 18. FIG. 3 is an alternate embodiment and illustrates a plurality of rectangular or square passages 18.

FIG. 4 illustrates an alternate embodiment where a plurality of separate smaller pipes or conduits 19 are positioned around the liner 14 to form individual passages 18.

Figure 6:
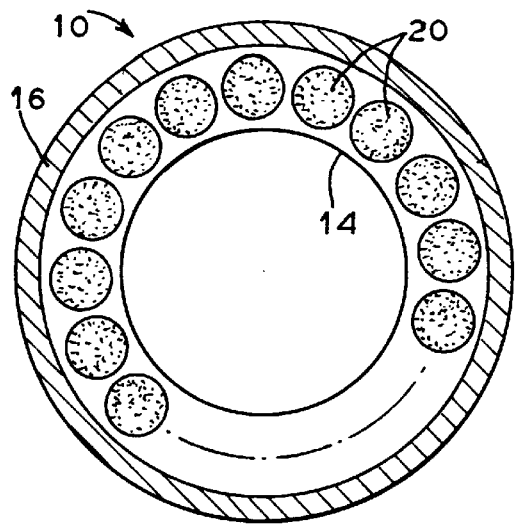
Figure 7:
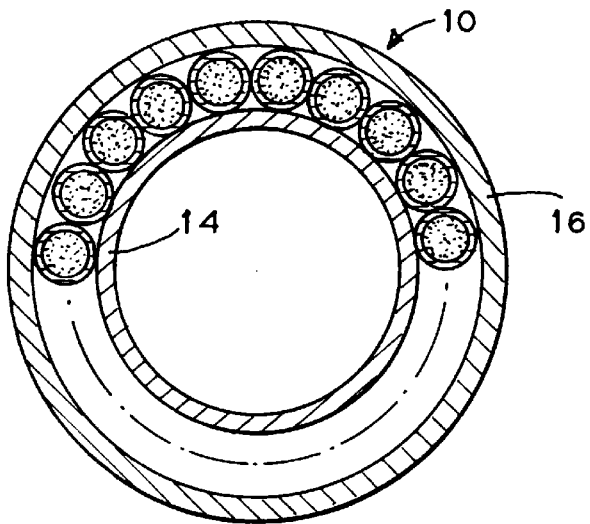

An insulation material 20 is received in the passages 18. The insulation material is preferably a load-bearing, permeable material to permit gas migration through the annulus. The insulation is illustrated in the preferred embodiment in FIG. 5 and in the alternate embodiments of FIGS. 6 and 7.

The insulation material may be solid particles, hollow spheres, or some composite material. The solid particles may be silica-based, ceramic, or other insulating substances. The hollow spheres may contain air, argon, or any other suitable gas. The composite material may be polystyrene or a phase change material (PCM). The PCM is preferably a microencapsulated type, such as that made by Frisby Technologies or Phase Change Laboratories. These phase change materials are paraffin type and are available in a dry power form for ease of handling. Vent holes 21 allow passage of gas build up in the inter-annular region to pass through the passages 18 or conduits 19.

Figure 8:
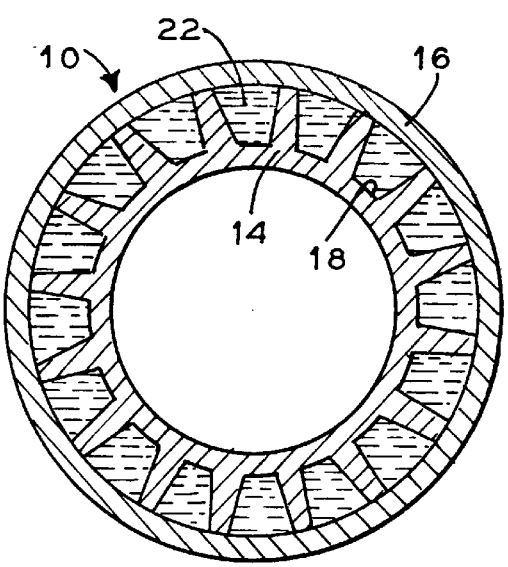
FIGS. 8–9 illustrate the use of liquid in the passages of the liner in the preferred and an alternate embodiment of the invention.
Figure 9:
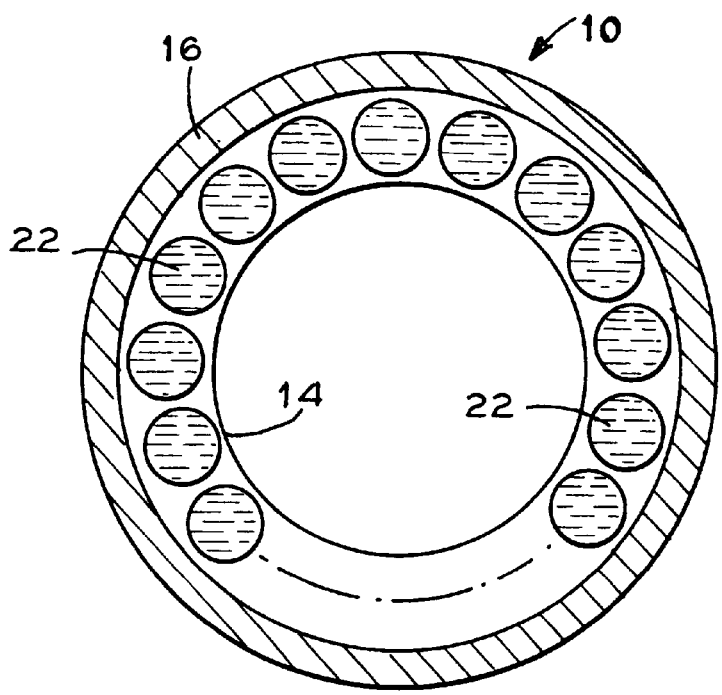

As seen in FIGS. 8 and 9, an alternative to the use of particles as insulation material is the use of an insulating liquid 22, possibly a bulk PCM. Bulk phase change materials include salt hydrate and paraffin-based materials.

Figure 10:
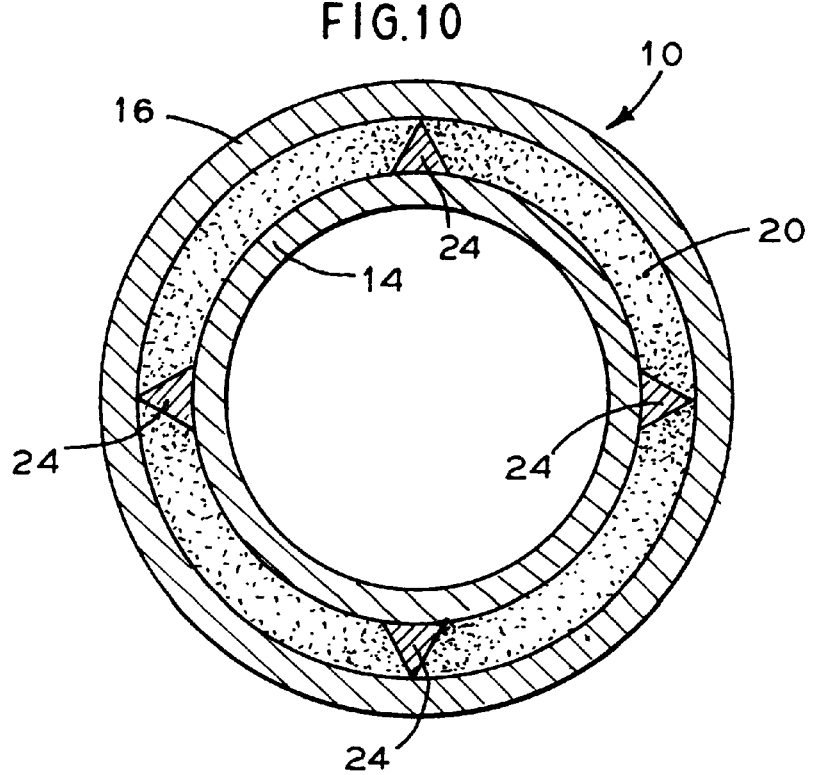
FIG. 10 illustrates another alternate embodiment of the invention.

As seen in FIG. 10, an alternate configuration to using a liner with passages is to use a plain liner with insulation around the liner 14 inside of the outer pipe 16. The liner may have standoffs 24 that center the liner with the outer pipe.

To form the pipeline 10, the liner 14 is installed inside the outer pipe 16 by means of swage lining. This is a process where the diameter of the inner pipe is reduced by placing it in tension by being pulled at one end by a pull head and held by rollers at the opposite end. The inner pipe is pulled through the outer pipe in whatever length is required. When the tension is released, the liner fits tightly against the inner surface of the outer pipe.

Either during or after installation of the inner pipe, the passages 18 are filled with the desired insulation material. The insulation material may be installed in several ways. Conduits 19 of the alternate embodiment of FIG. 4 may be prefilled with the insulation material. The insulation material may be put directly into the passages before pulling into the outer pipe. The insulation material may be put into the passages after the inner pipe has been installed in the outer pipe.

The present invention solves the problem of producing a highly effective insulated pipeline at a much lower cost than conventional external insulation or conventional steel pipe-in-pipe concepts. The present invention also solves the problem of providing lower cost corrosion resistance while also solving the potential issue of liner collapse. The present invention is an improvement over the concept of a grooved liner because the use of a filler insulation material keeps the passages from collapsing due to plastic creep under high pressure and temperatures.

The invention provides an advantage of reduced cost because polymeric pipe is much cheaper to manufacture and install than either external insulation coatings or conventional pipe-in-pipe designs. The invention also permits use of plastic lined carbon steel pipes for transport of gases which can permeate the polymer liner. The vented passages provide cost effective corrosion resistance while solving the problem of liner collapse. The use of a crush resistant insulation maintains an open pathway for gas migration whereas a grooved liner concept would likely collapse at high pressures and temperatures due to plastic creep. The combination of corrosion resistance and insulation in a single structure is a sturdy and cost effective solution for pipelines when both capabilities are required.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A pipeline, comprising:
   a. an outer pipe;
   b. an inner liner received within said outer pipe so as to be concentric therewith and define an annulus between said liner and outer pipe, said liner having a plurality of passages therethrough; and
   c. phase change insulation material received in the passages in said liner.

2. The pipeline of claim 1, wherein said insulation material is load bearing.

3. The pipeline of claim 1, wherein said insulation material is gas permeable.

4. The pipeline of claim 1, wherein the passages through said liner are substantially U-shaped in cross-section.

5. A pipeline, comprising:
   a. an outer pipe;
   b. an inner liner received within said outer pipe so as to be concentric therewith and define an annulus between said liner and outer pipe, said liner having a plurality of passages therethrough that are formed by a plurality of conduits surrounding said inner liner; and
   c. insulation material received in the passages in said liner.

6. The pipeline of claim 5, wherein each of said conduits is provided with a vent hole.

7. A pipeline, comprising:
   a. an outer pipe;
   b. an inner liner received within said outer pipe so as to be concentric therewith and define an annulus between said liner and outer pipe, said-liner pipe being formed from a polymer;
   c. said liner having a plurality of passages therethrough; and
   d. insulation material received in the passages in said liner, said insulation material being gas permeable.

8. The pipeline of claim 7, wherein said insulation material is load bearing.

9. The pipeline of claim 7, wherein said insulation material comprises a phase change material.

10. The pipeline of claim 7, wherein the passages through said liner are substantially U-shaped in cross-section.

11. The pipeline of claim 7, wherein the passages through said liner are substantially circular in cross section.

12. The pipeline of claim 7, wherein the passages through said liner are formed by a plurality of conduits surrounding said inner pipe.

13. The pipeline of claim 12, wherein each of said conduits is provided with a vent hole.

14. A pipeline, comprising:
   a. an outer pipe;
   b. a liner received within said outer pipe so as to be concentric therewith and define an annulus between said liner and outer pipe, said liner pipe being formed from a polymer;
   c. said liner having a plurality of passages therethrough; and
   d. phase change insulation material received in the passages in said liner, said insulation material being gas permeable.

15. A pipeline, comprising:
   a. an outer pipe;
   b. an inner liner received within said outer pipe so as to be concentric therewith and define an annulus between said liner and outer pipe, said liner having a plurality of passages therethrough that are substantially circular in cross section; and
   c. insulation material received in the passages in said liner.

* * * * *